W. J. JONES.

INCANDESCENT LAMP SOCKET.

APPLICATION FILED SEPT. 26, 1916.

Reissued Aug. 7, 1917.

14,341.

Inventor:
Walter J. Jones.
by Albert G. Davis
His Attorney.

UNITED STATES PATENT OFFICE.

WALTER J. JONES, OF NEW YORK, N. Y., ASSIGNOR TO GENERAL ELECTRIC COMPANY, A CORPORATION OF NEW YORK.

INCANDESCENT-LAMP SOCKET.

14,341. Specification of Reissued Letters Patent. Reissued Aug. 7, 1917.

Original No. 818,253, dated April 17, 1906, Serial No. 38,597, filed December 3, 1900. Application for reissue filed September 26, 1916. Serial No. 122,300.

*To all whom it may concern:*

Be it known that I, WALTER J. JONES, a citizen of the United States, residing at New York, county of New York, State of New York, have invented certain new and useful Improvements in Incandescent-Lamp Sockets, of which the following is a specification.

My invention relates to sockets for incandescent lamps, and especially those used in series incandescent lighting. In such a system it is necessary to provide some means for keeping the circuit closed in case a lamp burns out or is removed from its receptacle. Moreover, it is highly desirable to provide such an arrangement of contacts that there will be no danger of an arc when one removes the socket from the receptacle. These objects I accomplish by the invention which forms the subject of the present application. I provide a receptacle with spring-contacts which remain closed until the spring-contacts on a lamp-socket are thrust in between them. The lamp-socket contacts are normally separated by a piece of insulation of low dielectric strength, so that it will break down and shunt the lamp in case the lamp-filament breaks or burns out. The spring-contacts on the lamp-socket are so arranged that when the socket is withdrawn from the receptacle said springs remain in engagement with those on the receptacle until after the latter have closed together, thus preventing the formation of an arc.

Figure 1:
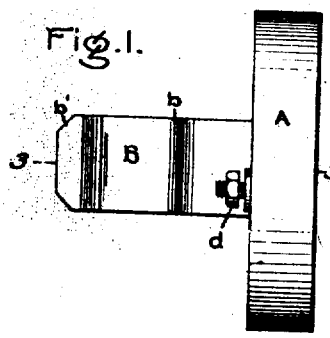
Figure 2:
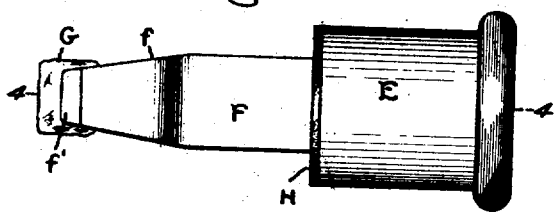
Figure 3:
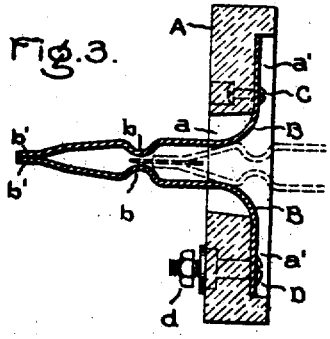
Figure 4:
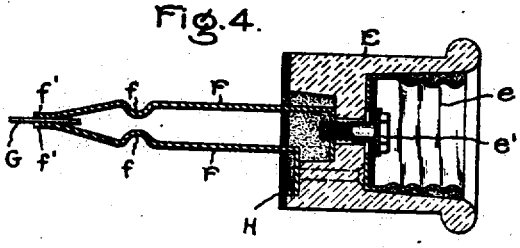
Figure 5:
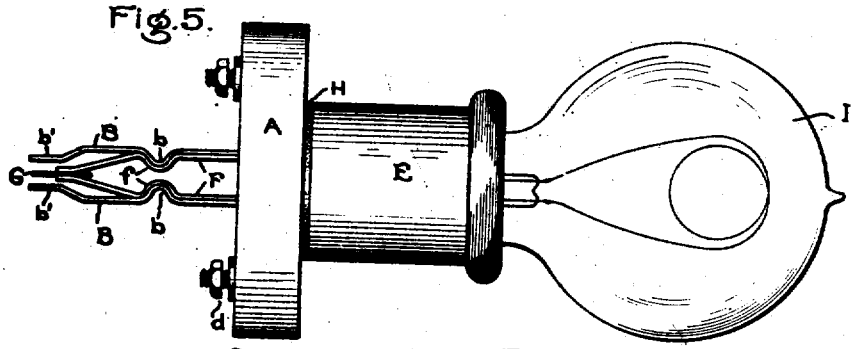
Figure 6:
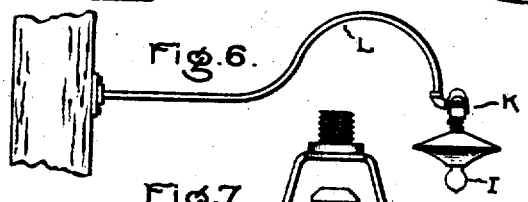
Figure 7:
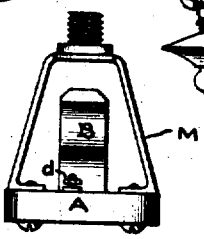

In the drawings, Figure 1 is a side elevation of the receptacle; Fig. 2 is a side elevation of the socket; Fig. 3 is a section of the receptacle on the line 3—3, Fig. 1; Fig. 4 is a section of the socket on the line 4—4, Fig. 2; Fig. 5 shows the parts assembled, with the lamp in the socket; Fig. 6 shows a lamp and bracket such as are used in series incandescent lighting, and Fig. 7 shows the receptacle provided with a frame for mounting it on such a bracket.

The receptacle is composed of a disk A of insulating material, such as porcelain, having a central hole *a* and oppositely-arranged grooves *a'* running from said hole toward the edge of the disk. In each groove is received one end of a flat metal spring-contact B, which is fastened by a screw C and has also a screw D, provided with a nut *d* for attaching the line-wire terminals. Each spring has a bead *b* and an inclined end *b'*, said ends being normally in contact when no lamp-socket is in circuit, as shown in Fig. 3.

The lamp-socket E, of porcelain or the like, contains the usual contacts *e e'* for the lamp-terminals, each in electrical connection with a flat metal spring F, projecting from the bottom of the socket. Each spring has a bead *f* and an inclined end *f'*, said ends clamping between them a flat piece of insulation G, such as paper, silk, or the like. The bottom of the socket has a protecting-washer H, of rubber or the like, to keep the socket from chipping when it is pushed against the receptacle.

When the lamp-socket is out of the receptacle, the spring-contacts B automatically keep the circuit closed. When a lamp I is to be cut into the circuit, it is inserted into the socket E, whose springs F are then thrust in between the springs B, making firm contact therewith before the ends *b'* of the springs are separated. When the socket has been pushed home, the beads *b* lie in the beads *f*, and not only securely retain the socket in place, but make a good electrical connection between the line-terminals and the lamp-terminals, the ends *b'* of the spring B being widely separated, as shown in Fig. 5. The insulation G prevents any short-circuiting of the lamp.

If a lamp-filament breaks or burns out, the current breaks down the insulation G and closes the circuit between the springs F. When the lineman removes the socket to replace the insulation cut-out, the springs B come together before the springs F have separated from them, as indicated by the dotted lines in Fig. 3, so that no dangerous arc can form, nor is the lineman in danger of getting a shock from the line. A further protection is afforded by the fact that the contacts are entirely hidden when the socket is in place. Moreover, since the socket must be completely removed before the cut-out G can be renewed, all liability of a short-circuit through the lineman is avoided.

Fig. 6 shows a series incandescent lamp-fixture K hung on a bracket L. In such a fixture the receptacle is provided with a frame or bridge M, by which it is attached to the support at the end of the bracket.

What I claim as new and desire to secure by Letters Patent of the United States, is,—

1. In series incandescent lighting, a receptacle comprising an insulating block provided with automatic line-closing contacts, an insulating socket closed at one end and open at the other and provided, adjacent to the latter, with contacts encompassed by said insulation and adapted for coaction with the base of an ordinary lamp and, adjacent to the closed end, with cooperating contacts normally separated by insulation of low dielectric value, and means for detachably connecting said socket and receptacle and thereby opening said line-closing contacts, the insulating outer surface of said socket forming a hand-hold free from conductive parts or dangerous proximity thereto and adapted to be grasped to detach said socket from said receptacle.

2. A three-part structure comprising, first, a receptacle of solid insulation carrying line-closing terminals included in an electrical circuit and normally in contact, second, a detachable socket also of solid insulation and carrying lamp-base-contacts and film cut-out contacts in electrical communication with said contacts and adapted, when said socket is attached to said receptacle, to coact with said line-closing terminals to open the same, said socket when attached to said receptacle, being beyond and outside of said receptacle and in position to be readily and safely grasped by the hand for detachment, and, third, an incandescent lamp having an ordinary base including electrical contacts adapted to coact with the contacts in said socket, and, through them, with said film cut-out and said line-closing terminals.

3. In series incandescent lighting, a receptacle having two spring-contacts adapted to close against each other, a lamp-socket adapted to receive an ordinary incandescent lamp therein and carrying two spring-contacts adapted to close against each other, and a detachable piece of insulation between said socket-contacts.

4. In series incandescent lighting, a receptacle provided with two spring-contacts having beads and inclined ends, a lamp-socket adapted to receive an ordinary incandescent lamp therein and provided with two coöperating spring-contacts having beads and inclined ends, and a detachable piece of insulation between the ends of the socket-contacts.

5. The combination with a receptacle A having spring-contacts B, of a socket E adapted to receive an ordinary incandescent lamp therein and having spring-contacts F and a detachable piece G of material of low insulating value between the contacts F.

6. In an electric-lamp fixture, the combination with threaded supporting means, of a yoke comprising a body part with a central threaded seat into which the said threaded supporting means are screwed and having at its periphery depending legs with inwardly-turned feet, a plate of insulation rigidly bolted to said feet, and circuit-terminals and lamp-supporting means on said plate of insulation.

In witness whereof, I have hereunto set my hand this twenty-first day of September, 1916.

WALTER J. JONES.